United States Patent
Francisco et al.

(10) Patent No.: US 8,899,009 B2
(45) Date of Patent: Dec. 2, 2014

(54) FUEL ANTI-ICING AND APU COMPARTMENT DRAIN COMBINATION

(75) Inventors: Jay M. Francisco, Chula Vista, CA (US); Greg R. Giddings, San Marcos, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1003 days.

(21) Appl. No.: 12/984,629

(22) Filed: Jan. 5, 2011

(65) Prior Publication Data

US 2012/0167579 A1 Jul. 5, 2012

(51) Int. Cl.
| | |
|---|---|
| *F02G 3/00* | (2006.01) |
| *F02C 1/00* | (2006.01) |
| *F02C 7/08* | (2006.01) |
| *F02C 6/08* | (2006.01) |
| *F02C 7/224* | (2006.01) |

(52) U.S. Cl.
CPC .............. *F02C 6/08* (2013.01); *F05D 2220/50* (2013.01); *F02C 7/224* (2013.01)
USPC .............. 60/39.094; 60/728; 60/730; 60/736; 60/782

(58) Field of Classification Search
CPC ........ F02C 6/08; F02C 7/224; F05D 2220/50; F05B 2260/205
USPC .............. 60/39.094, 266, 267, 728, 730, 736, 60/782, 785
See application file for complete search history.

(56) References Cited

U.S. PATENT DOCUMENTS

| | | | |
|---|---|---|---|
| 4,104,873 A | 8/1978 | Coffinberry | |
| 4,120,150 A | 10/1978 | Wakeman | |
| 4,696,156 A | 9/1987 | Burr et al. | |
| 4,759,401 A | 7/1988 | Pfouts et al. | |
| 5,287,694 A * | 2/1994 | Davis et al. | ..................... 60/785 |
| 6,148,601 A | 11/2000 | Jones et al. | |
| 6,557,535 B2 | 5/2003 | Stone | |
| 6,666,015 B2 | 12/2003 | Dyer | |
| 7,059,130 B2 | 6/2006 | Kawamura | |
| 7,810,309 B2 | 10/2010 | Parsons | |
| 7,810,332 B2 | 10/2010 | Olmes et al. | |

OTHER PUBLICATIONS

Dean A Bartlett, The Fundamentals of Heat Exchangers, 1996, American Institute of Physics, p. 1 http://web.archive.org/web/20030608105004/http://www.aip.org/tip/INPHFA/vol-2/iss-4/p18.pdf.*

* cited by examiner

*Primary Examiner* — Phutthiwat Wongwian
*Assistant Examiner* — William Breazeal
(74) *Attorney, Agent, or Firm* — Carlson, Gaskey & Olds, PC

(57) ABSTRACT

A heat exchanger has a first passage to be connected to a source of fuel. The heat exchanger has an outlet to communicate the fuel downstream. A second passage connects to a source of air. The air passes adjacent to the first passage to heat fuel in the first passage. A jet pump is positioned downstream of the second passage to receive air from the second passage. The jet pump includes a tap connected to a housing compartment to drain fluid from the compartment. A method is also disclosed.

16 Claims, 3 Drawing Sheets

FUEL ANTI-ICING AND APU COMPARTMENT DRAIN COMBINATION

BACKGROUND

This application relates to a system which combines a heat exchanger for de-icing fuel in a gas turbine engine with a drain for draining a compartment in an associated aircraft.

An auxiliary power unit "APU" is often provided along with a main gas turbine engine on an aircraft. The APU typically includes a small gas turbine engine, and is started to provide power, or bleed air for the Environmental Control System typically before the main gas turbine engines are started.

The fuel leading to the APU gas turbine engine passes through a filter on the way to a the APU. During ground and flight cycles, it may sometimes be necessary to start the APU. Often the aircraft operates at very low temperature. At low temperature, fuel icing can block the fuel filter. Thus, it is known to utilize hot oil from a gear box to heat the fuel in a heat exchanger before it reaches the filter.

It is also typically necessary to drain collected fluid from a housing or compartment in an aircraft. There is a negative pressure inside this compartment if the compartment has an eductor system, and this can complicate proper gravity draining of the APU compartment.

SUMMARY

A heat exchanger has a first passage to be connected to a source of fuel. The heat exchanger has an outlet to communicate the fuel downstream. A second passage connects to a source of air. The air passes adjacent to the first passage to heat fuel in the first passage. A jet pump is positioned downstream of the second passage to receive air from the second passage. The jet pump includes a tap connected to a housing compartment to drain fluid from the compartment. A method is also disclosed and claimed.

These and other features of the present invention can be best understood from the following specification and drawings, the following of which is a brief description.

DETAILED DESCRIPTION

Figure 1:
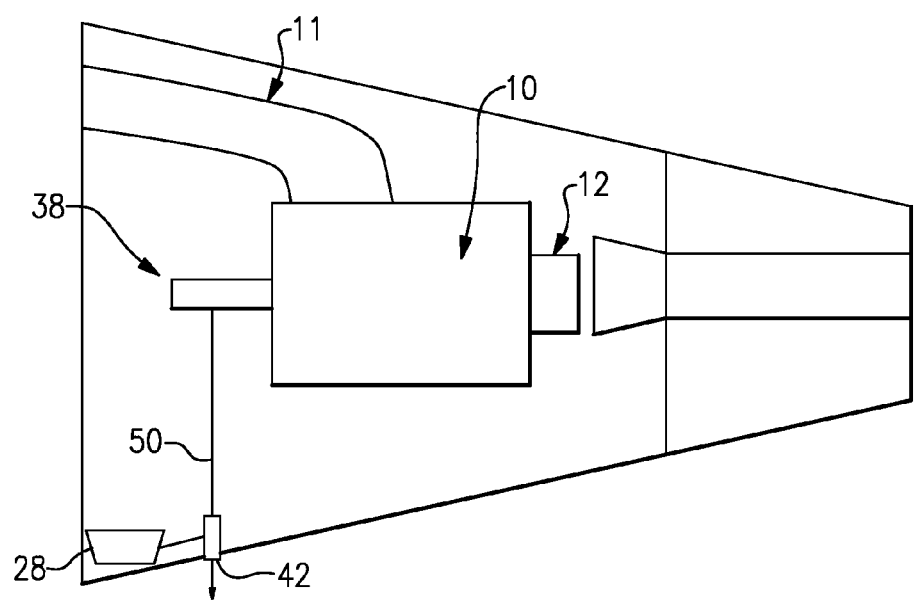
FIG. 1 shows a portion of an aircraft.

FIG. 1 shows an aircraft 7 incorporating the present invention. An auxiliary power unit (APU) 10 sits in the tail of the aircraft 7. Air from duct 11 passes to the APU 10 and out of a nozzle 12. A tap 50 is connected to drain fluid from the interior of a housing compartments 28.

Figure 2:
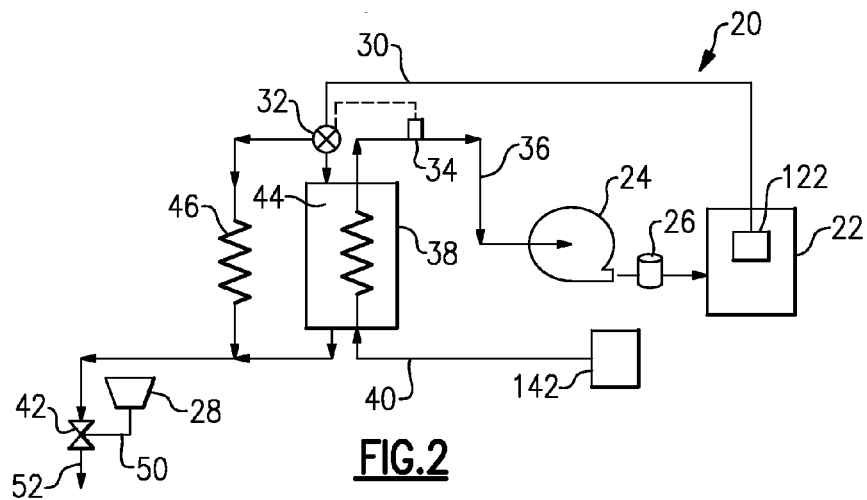
FIG. 2 shows a first embodiment of the present invention.

FIG. 2 shows a system 20 to be associated with a gas turbine 22 that is part of an auxiliary power unit ("APU"), such as APU 10 (see FIG. 1). Compartment 28 surrounds the entire APU and is shown schematically.

A fuel pump 24 draws fuel from a source 142, through a line 40, a heat exchanger 38, a line 36, and a fuel filter 26. As mentioned above, the aircraft may sometimes be at extremely low temperature, and thus ice can form in the fuel, and clog the filter 26.

The heat exchanger 38 is designed to maintain fuel temperature above freezing and melt any ice crystal formation, and alleviate this problem. As shown, a compressor bleed air tap 30 taps compressor air from a compressor 122 in the gas turbine engine 22, and passes it through a three-way valve 32 into a section 44 of the heat exchanger 38. This air flows around the line 40 containing the fuel, and heats the fuel on its way to the fuel filter 26.

A temperature sensor 34, which can be a electrical thermocouple or thermal expansion device, senses the temperature of the fuel, and operates to control the three-way valve 32 to route the air from line 30, either into section 44, or into an air tube coil 46. The air tube coil 46 does not heat the fuel, but rather provides a coiled path to increase the surface area, and ensure the air is better cooled before it reaches an output 52, as will be explained below.

Sensor 34 operates to control the valve 32 to ensure the fuel leaving the heat exchanger 38 is of a desired temperature. On the other hand, if the fuel becomes too hot (for example, above 90° F. (32° C.)), then the valve 32 is switched such that the hot compressor air (which may be on the order of 450° F. (232° C.)) is passed through coil 46, no longer heating the fuel.

The air downstream of the heat exchanger 38 and coil 46 passes through a venturi or jet pump 42. As known, the pump 42 passes the air through a restriction which greatly increases the velocity to the outlet 52. A tap 50 to the compartment 28 drains the fluid, as it is entrained with the air passing through the pump 42. The air leaving the outlet 52 may be on the order of 138° F. (59° C.).

With this system, a single arrangement heats the fuel and also drains the compartment.

Figure 3:
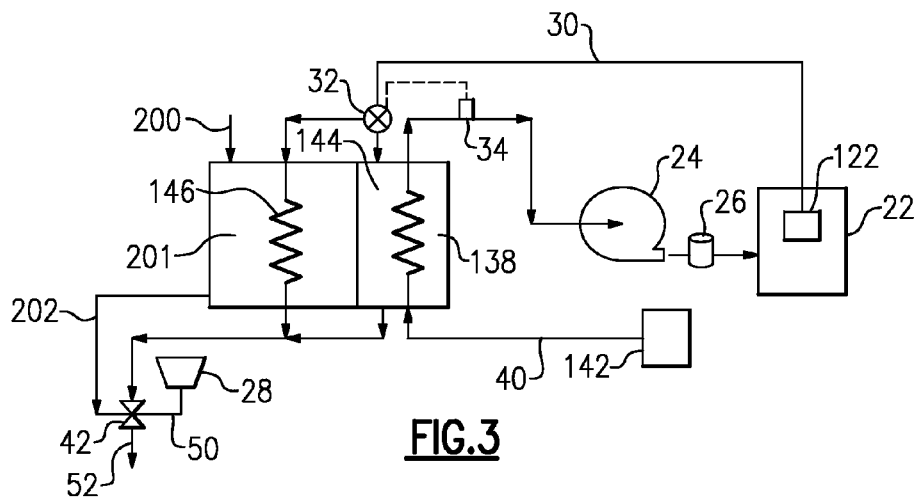
FIG. 3 shows a second embodiment.

FIG. 3 shows another embodiment, which is generally the same as FIG. 1, other than the heat exchanger 138 now incorporates both the fuel heating path and the optional path. The heat exchanger 138 may include the valve 32 which is controlled as in the above embodiment. The air may be routed into a section 144, where it heats the fuel. Alternatively, the air can pass through a path 146. Air from a compartment tap 200 may pass within a section 201 of the heat exchanger 138 to cool the air in the passage 146.

The pump 42 captures air at 202, and the air downstream of the passage 146, and the compartment 144. Pump 42 operates as in the above embodiment to drain the compartment 28.

Figure 4:
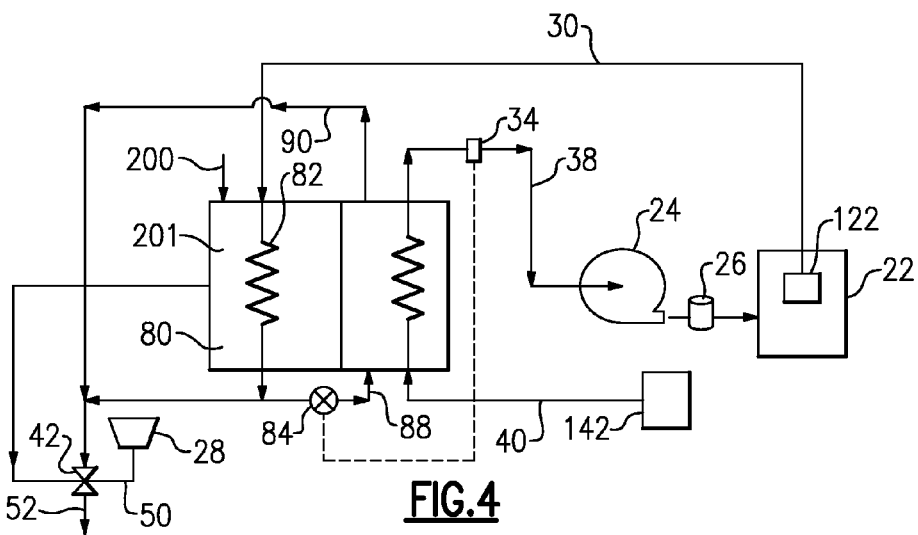
FIG. 4 shows a third embodiment.

FIG. 4 shows yet another embodiment, which again operates generally as in the above embodiments, other than the operation of the heat exchanger. Here, air passes from the compressor tap 30 through a passage 82 in a section 80 which is cooled by compartment air tap 200. The compartment air passes downstream to pump 42 as in the prior embodiment. However, the air from passage 82 may be directly routed to the pump 42, or may be pass through a valve 84 into a path 88 to heat the fuel in line 40. When air does pass into path 88, it then moves to return line 90, and then back to the pump 42. Again, the valve 84 is controlled to ensure that the temperature of the fuel reaching the fuel pump 24 is as desired, and as explained above.

Figure 5:
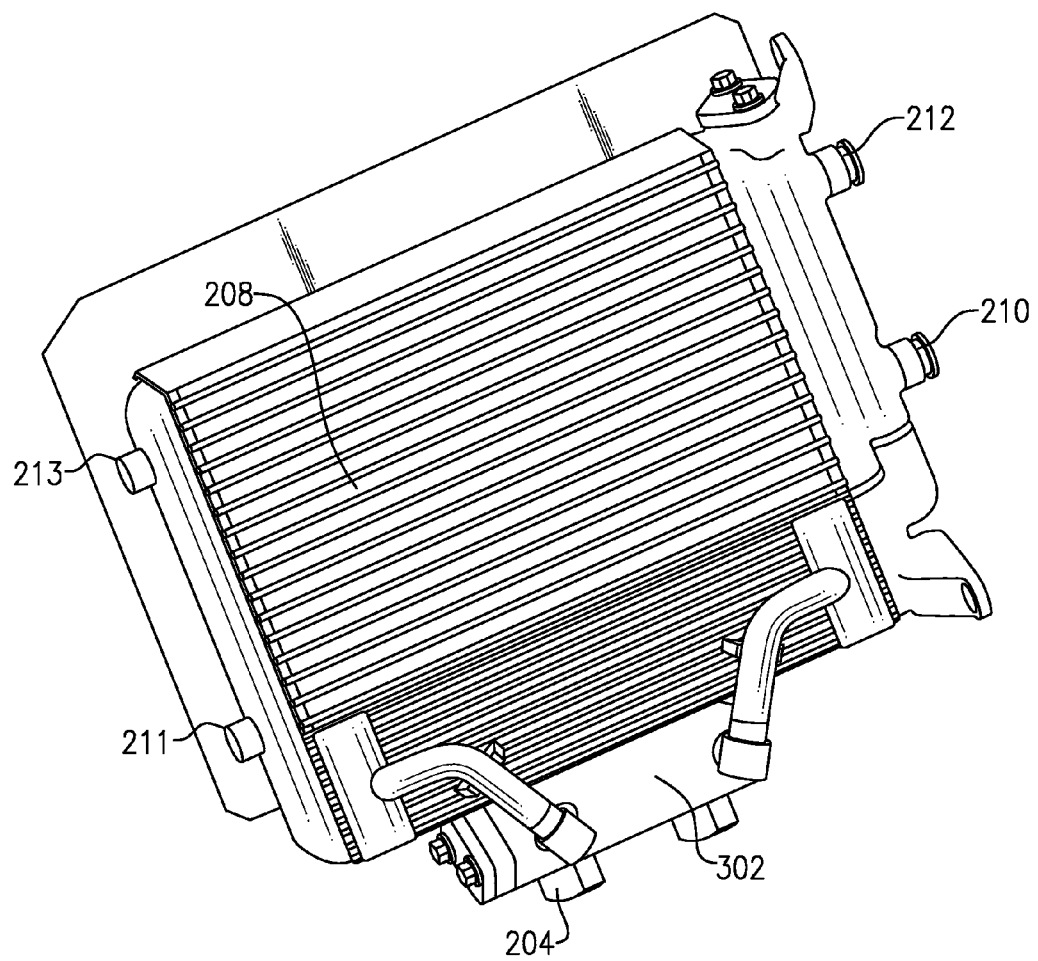
FIG. 5 shows an example heat exchanger.

FIG. 5 shows one embodiment of a heat exchanger 205. Heat exchanger 205 includes the air inlets 210 and 212, and air outlets 211 and 213. Fuel receiving tube 208 communicates with a fuel supply port 302, and a fuel discharge line 204. A valve 206 controls bypass of this fuel, and would be understood to a worker in this art.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A heat exchanger and fluid drain system comprising:
   a heat exchanger having a first passage to be connected to a source of fuel, and said heat exchanger having an outlet on said first passage to communicate fuel downstream;
   a second passage for connecting to a source of air, said source of air passing adjacent to said first passage to heat fuel in the first passage;
   a jet pump positioned downstream of said second passage for receiving air from said second passage, said jet pump including a tap to be connected to a housing compartment to drain fluid from the housing compartment;
   a valve configured to selectively route air into one of the second passage, or into a third passage, the third passage serving to cool the air when fuel heating is not necessary; and
   a sensor configured to senses the temperature of fuel, and control said valve in response to the temperature.

2. The system as set forth in claim 1, wherein the sensor activates the valve and routes the source of air into the second passage should further heating of the fuel be desired, and routes air into the third passage should the temperature of the fuel be above a desired temperature.

3. The system as set forth in claim 1, wherein the air passes into the second passage, or into the third passage, and reconnects into a common line downstream of the heat exchanger before reaching the jet pump.

4. The system as set forth in claim 3, wherein said third passage is a coiled tube, which is cooled by ambient air.

5. The system as set forth in claim 3, wherein said third passage is positioned within a heat exchanger compartment which receives a cooling air supply.

6. The system as set forth in claim 1, wherein the air reaching said second passage is provided by a tap to a compressor in an associated gas turbine engine.

7. The system as set forth in claim 1, wherein said valve is one of an electrically actuated or a thermally actuated device.

8. An auxiliary power unit comprising:
   a gas turbine engine including a compressor section;
   a fuel pump; and
   a heat exchanger having a first passage connected to a source of fuel, and said heat exchanger having an outlet on said first passage to communicate the fuel downstream to the fuel pump, a second passage connected to a source of air provided by a tap to the compressor section, said source of air passing adjacent to said first passage to heat fuel in the first passage; and
   a jet pump positioned downstream of said second passage for receiving air from said second passage, said jet pump including a tap to be connected to a housing compartment to drain fluid from the housing compartment.

9. The auxiliary power unit as set forth in claim 8, wherein a valve routes air into the second passage, or into a third passage, the third passage serving to cool the air when fuel heating is not necessary.

10. The auxiliary power unit as set forth in claim 9, wherein a sensor senses the temperature of fuel, and controlling said valve in response to the temperature.

11. The auxiliary power unit as set forth in claim 10, wherein the sensor activates the valve and routes the source of air into the second passage should further heating of the fuel be desired, and routes air into the third passage should the temperature of the fuel be above a desired temperature.

12. The auxiliary power unit as set forth in claim 9, wherein the air passes into the second passage, or into the third passage, and reconnects into a common line downstream of the heat exchanger before reaching the jet pump.

13. The auxiliary power unit as set forth in claim 12, wherein said third passage is a coiled tube, which is cooled by ambient air.

14. The auxiliary power unit as set forth in claim 12, wherein said third passage is positioned within a heat exchanger compartment which receives a cooling air supply.

15. The auxiliary power unit as set forth in claim 8, wherein a third passage communicates to a line which passes through a valve, said valve controlling flow from the third passage, downstream of a heat exchanger, and into the second passage.

16. A method of passing fuel to a fuel pump in a gas turbine engine comprising the steps of:
   (a) passing fuel through a heat exchanger;
   (b) passing heated air adjacent to the fuel to heat the fuel;
   (c) passing the air downstream of the heat exchanger through a jet pump, the jet pump being connected to entrain fluid from a housing compartment; and
   a valve selectively directs air to heat the fuel, or in a distinct direction, with the air from the distinct direction also being directed into the jet pump.

* * * * *

UNITED STATES PATENT AND TRADEMARK OFFICE
CERTIFICATE OF CORRECTION

PATENT NO. : 8,899,009 B2
APPLICATION NO. : 12/984629
DATED : December 2, 2014
INVENTOR(S) : Jay M. Francisco It is certified that error appears in the above-identified patent and that said Letters Patent is hereby corrected as shown below:

IN THE CLAIMS:

In claim 1, column 3, line 20; delete "senses" and replace with --sense--

Signed and Sealed this
Twenty-fourth Day of March, 2015

Michelle K. Lee
*Director of the United States Patent and Trademark Office*